R. H. PAUL.
SCORE COMPUTER AND INDICATOR.
APPLICATION FILED JUNE 22, 1916.

1,314,897.

Patented Sept. 2, 1919.
3 SHEETS—SHEET 1.

R. H. Paul.
Inventor.

By Albert E. Parker
Attorney.

R. H. PAUL.
SCORE COMPUTER AND INDICATOR.
APPLICATION FILED JUNE 22, 1916.

1,314,897.

Patented Sept. 2, 1919.
3 SHEETS—SHEET 3.

R. H. Paul.
Inventor.
By *Albert E. Parker*
Attorney.

UNITED STATES PATENT OFFICE.

RALPH HERBERT PAUL, OF BRISBANE, QUEENSLAND, AUSTRALIA.

SCORE COMPUTER AND INDICATOR.

1,314,897.   Specification of Letters Patent.   Patented Sept. 2, 1919.

Application filed June 22, 1916. Serial No. 105,249.

*To all whom it may concern:*

Be it known that RALPH HERBERT PAUL, a subject of the King of Great Britain and Ireland, residing at 373 Queen street, Brisbane, Queensland, Australia, has invented certain new and useful Improvements in Score Computers and Indicators, of which the following is a specification.

This invention relates to a mechanical device for separately scoring two distinct orders of points gained in certain card games, for summing certain of these points together, for indicating the totals of primary points and of summed points, for indicating the finish of a game and the number of games won by either side, and also for indicating trump suits and the nature of the "contract" undertaken by a "declarant" in games such as "Bridge", "Auction-Bridge", "Lilly-Bridge", and variations thereof. The invention belongs to that class of mechanical scoring and indicating devices in which trick points, and honor penalty and allowance points, are recorded separately in such a manner that the trick points are doubly summed, first, individually in the trick point total, and secondly as a component in the grand total of points including honors, penalties and allowances. Scorers of this type are known; they usually consist of a plurality of superposed concentric disks of different diameters rotatable in a case, the face of which is sector slotted and pierced with total display apertures through which the totals may be read and the symbols observed which indicate the conclusion of a game. In known scorers of this type an inner disk, on which the trick points are scored by rotating it through an appropriate angle by means of a stylus instrument, is interlocked by the point of such stylus with an underlying portion of another disk on which the honors, &c., points are scored, this latter disk, however, being capable of rotation independently of the trick points disk when positively moved by means of the stylus.

The present invention consists in certain improvements in such mechanical game scoring and indicating apparatus, and it is characterized by certain improvements therein which may be classified as follows:—

First, in a simplified mechanical construction whereby cost of manufacture is diminished.

Second, in a more effective means than heretofore employed for displaying the nature of the contract made by the declarant.

Third, in improved mechanical means for interlocking the trick points indicator with the honors &c. points indicator.

Fourth, in improved mechanical devices for preventing accidental overrunning and reversal of the indicators.

Fifth, in improved mechanical devices for moving the hundreds-and-thousands grand total indicator by progression from the units-and-tens grand total indicator, whenever the latter is moved through one hundred spaces.

Sixth, in the provision of means whereby scores won under a declaration of 100 or over may be recorded in practically one stylus movement.

Heretofore in scoring say 500 points won under a declaration, six or seven stylus movements were necessary.

In practice, I construct my counter as a "pair counter" with two faces or dials for recording respectively the scores of the opposing sides or players, one of these faces being marked "We" or similarly, and the other "They" or similarly, according to common usage. In the vacant angular area contained between the two circular dials I locate an additional dial ("straddling dial") on which is displayed a record of any condition undertaken by or imposed on the declarant in relation to the making of his score; thus in the game of Bridge to indicate whether the contract points have been "doubled", "redoubled," &c. Obviously, however, separate individual counters may be constructed if required instead of pair-counters.

Each counter comprises a central dial portion divided into sectors each of which contains an indicator for the card suit, respectively Hearts, Diamonds, Clubs, Spades, Royal-Spades and No-Trumps. Where the nature of the game requires a lesser or greater number of such indicators the central dial is subdivided into a lesser or greater number of sectors with indicators accordingly displayed on them. Each of these sectors is radially subdivided along the edge and marked with figures 1 to 7 (or any other necessary range), indicating odd tricks. A central pointer with latch pin to prevent accidental displacement is provided to be set over the particular trump suit and pointing to the particular number of odd tricks undertaken to be won by the declarant.

The cover plate of the counter bears the declaration dial upon its face; surrounding the declaration dial and concentrically with it are four segmental slots and two total display apertures. In one of these apertures the totals of trick points and the "Game Won" indicators are displayed; in the other one the grand total score indicators are displayed. Of the segmental slots, the innermost one is a short slot only adapted to exhibit texts or symbols on an independent disk dial which displays a record of the number of games (if any) won. The other three segmental slots provide access to perforations in concentrically arranged ring dials, one of which relates to the trick points and carries corresponding markings, the others relating to the grand total points, the outermost one being the "major" or hundreds-and-thousands dial, and the inner one the "minor" or units-and-tens dial. The provision of a major-grand-total dial is a novelty. This dial facilitates the rapid recording of heavy scores by a single movement of the stylus, and also qualifies the instrument for recording a larger range of grand-total figures. A drag pawl (or two such pawls to provide against failure of action) connects the trick point dial with the minor-grand-total dial, so that when the trick point dial is moved it will carry the minor-grand-total dial with it through a corresponding angle of rotation, whereas when either of the grand-total dials is operated, the trick-point dial will remain unmoved. At each complete rotation of the minor-grand-total dial it is caused to trip a pawl and lock device and move the major-grand-total dial forward one step.

In the accompanying drawings, Figure 1 is a divided view one half of which is an elevation and the other half a section taken below the lid of the case;

Fig. 2 is a sectional plan exhibiting in the upper portion pawl and lock mechanism through which movement is applied through the minor dial to the major dial of the grand-total indicator, while the lower portion is a horizontal sectional plan showing one-half the minor-grand-total dial cut away to exhibit parts located below it. The views contained in Fig. 2 are "halved" as far as possible for the purpose of displaying the parts of the apparatus without unnecessarily increasing the number of separate views;

Figure 1:
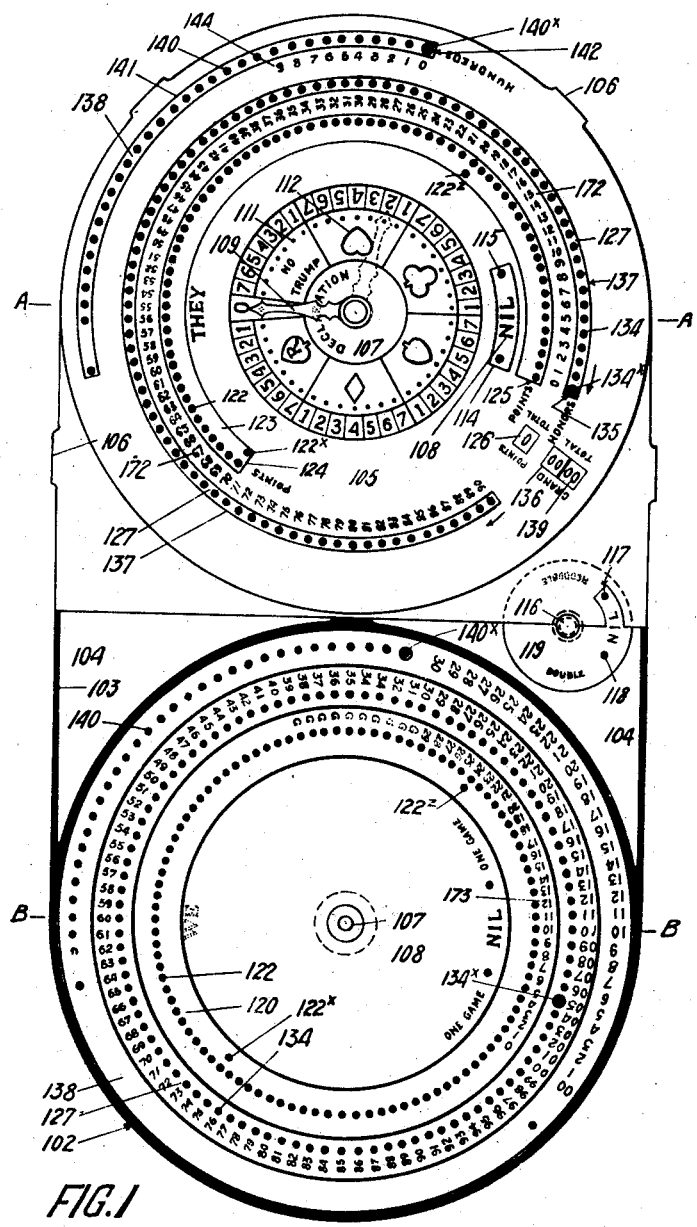

In order to obviate confusion with figures appearing on the drawing to indicate the numeration printed or embossed on parts of the counter, the figures of reference used for the purpose of this specification commence at the figure 101; all figures of lower order ranging from 0 to 100 are figures used as indicators on the counter.

The case consists of a bottom plate 101, circular walls 102 encircling the two counters, and containing walls 103 inclosing with the walls 102 two angular chambers 104, in one of which the "straddle" indicator is housed. The case is closed on the face with a lid or cover plate 105. This cover plate is formed with lugs 106 to facilitate attachment of it by removable screws to the walls 102 and 103. The two counter dials are identical in construction and figuring with the exception that the cover plate of one is lettered "We" and the cover plate of the other is lettered "They", as best indicated in Fig. 1, so as to indicate the respective side to which the particular count relates; but obviously any other symbol or indicator may be adopted instead of the words "We" and "They".

Figure 9:
Fig. 9 is an elevational view of the operating stylus by which the players engage the perforations in the dials and move the dials forward to change the score indications.

A central post 107 mounted vertically on the bottom plate 101 serves as a center for the games record dial 108, as a central support for the lid plate 105, and as an arbor on which the declaration indicator hand 109 may turn. This hand is constructed of a spring plate and is fitted with a catch point 110 engageable with any one of the circle of holes or depressions 111 in the lid 105. A central part of the lid 105 is embossed or printed with a symmetrically arranged group of symbols or words referring to the declaration suits, respectively "No Trump", "Royal Spades", "Hearts" "Diamonds", "Clubs" and "Spades" (112) and, as before stated may contain other declarations or a greater or lesser number of declarations. Concentrically about the ring of holes 111 are sectors for each symbol 112, each group being numbered from 1 to 7; for each of these numbers a hole 111 is provided in the lid. The declaration indicator hand 109 is rotatable on its arbor 107, and when the "Contract" has been made in play this hand 109 is set in the sector containing the symbol of the suit declared with its pointer directed to the number of tricks undertaken in the contract. This declaration indicator dial is printed on the lid 105 and is therefore fixed; the only moving part connected with it being the indicator hand 109. The score indicators are all movable and are in the form of flanged rings rotatable concentrically within the case walls 102. They are not mounted on a center but are fitted neatly so as to be rotatable, their concentricity being maintained by edge contact with one another, with the walls 102, and with the collar 113 which is fixed concentrically on the bottom plate 101. There is however one dial, viz., the game record dial 108, which does move on the post 107 as a center. This dial is a flat disk lettered with the terms "Nil", "One Game", "Two Games", or otherwise as necessary, at certain intervals circularly on its face, so that either one of these texts according to the angular position of the disk will be exposed to view through the sector aperture 114. Between each of these texts the disk is pierced with a hole 115 into which the point of the stylus, Fig. 9, may be inserted for the purpose of rotating the disk to bring the required text exposed. Thus in playing "Bridge", during the first game the text "Nil" would be exposed, while during the second game the text "One Game" would be displayed on the dial belonging to the players by whom the first game had been won, the other dial showing "Nil".

The straddling dial 119 is mounted on an arbor 116 and is similarly pierced with holes and lettered "Nil", "Double", "Redouble", and otherwise as may be necessary. Any one of these texts may be displayed through the sector aperture 117, and the disk may be turned to expose the necessary text by inserting the stylus, Fig. 9, into one of the holes 118 and rotating the disk until the movement of the stylus is checked at the end of the slot 117. The trick points ring 120 is made with a flange 121 which sets inside the collar ring 113 so as to be freely rotatable within said ring, which forms a free running bearing for it. The ring 120 is pierced with a series of one hundred holes (122) concentrically disposed around it, and spaced equally apart. It is only essential that there should be for any particular game a number of these holes 122 corresponding with the number of points which it is possible to score in one game. For the game of "Bridge" the complete circle of 100 holes is provided. The circle of holes 122 is exposed through the trick sector 123 in the cover plate 105; this slot 123 is of sufficient width to expose two holes $122^x$ and $122^z$ in the ring 120, located close to but not within the course of holes 122. In the case of the modified construction Figs. 6 and 7, these holes $122^x$ and $122^z$ are not in alinement with any hole in the underlying ring. The holes $122^x$ and $122^z$ are readily located for the purpose of bringing the disk 120 back to zero. This resetting movement is effected by inserting the stylus, Fig. 9, into the special hole $122^x$ and rotating the disk backward thereby until the movement of the stylus is checked by contact with the rear end 124 of the slot 123; the hole $122^z$ being provided to enable this movement to be partially effected when the hole $122^x$ is hidden under a solid part of the cover lid 105. The forward motion of the disk 120 is effected by placing the stylus in the proper one of the holes 122, as per the indicators 172, and rotating the ring clockwise until the movement of the stylus is checked by contact with the forward end 125 of the sector slot 123. On the outer portion of the ring 120 a series of figures 173 is printed ranging from 0 to 29 (or other limit game winning number within 100) and then with repetitions of the letter G or other symbol to indicate when displayed in the aperture 126 that a sufficiency of trick points has been scored to win the "game". These figures and symbols are located so as to come successively into alinement below the trick points total display aperture 126 when the ring is rotated. The order of arrangement of the indicators 0 to 29 in relation to the ring resetting hole $122^x$ is such that when the disk 120 is in the zero position as shown in Fig. 1 and the hole $122^x$ against the end 124 of the slot 123 the numeral 0 will be displayed through the aperture 126.

The minor-grand-total ring 127 is a step flanged ring, the foot flange 128 of which works freely around the fixed circular collar 113 before referred to. An annular table 129 contained in this ring 127 carries an annular toothed crown 130, the teeth in which crown are formed as catch teeth, that is to say with one face approximately vertical and the other face angular. The ring 127 may be rotated through any required angle by means of the stylus as hereinafter described, or it may be rotated through an interlocking device from the ring 120. This interlocking device consists of a loosely hung push- or drag-link 131 (there may be two of these links) and operates to push against the teeth in the crown 130 and carry the ring 127 around with the ring 120 when the ring 120 is rotated, and it also operates to allow the ring 120 to stand idle when the ring 127 is rotated positively by the stylus and to allow the ring 120 to be turned reversely without disturbing the ring 127. For the purpose of preventing drag and accidental displacement of the ring 127, the underside of the table 129 is serrated radially, and the radial serrations engage one or more light tongue springs 132 fixed to the bottom plate 101. The contacting part of this spring 132 is roughened or serrated to lightly engage the serrations 133, but so as not to hold the ring 127 sufficiently to make the movement of it by the stylus or through the interlocking link 131 inconvenient. The ring 127 is pierced with a circular series of one hundred holes 134. One of these holes 134$^x$ is specially marked to serve as the zero resetting hole, and this hole is so located in the series of holes 134 in relation to the numeration printed on the outer part of this ring, that the numeration on said ring running from 00 to 99 will occupy such a position that when the hole 134$^x$ is at the forward end 135 of the sector slot 137, the figures 00 will be displayed in the inner part of the grand-total display aperture 136 (see Fig. 1).

In the annular space on the cover plate 105 contained between the sector slots 123 and 137 is printed a range of number indicators 172 one hundredth of the circumference apart and extending from 0 to 90. These number indicators are common to the two rings 120 and 127; they are printed so as to read as nearly as practicable erect and they serve to indicate for either of those rings 120 and 127 the particular hole 122 or 134 therein, as the case may be, into which the stylus should be inserted for the purpose of advancing the score by the particular number of digits designated by the selected number-indicator.

Occupying the outermost position in the case is the major or hundreds-and-thousands grand-total ring 138 which displays its totals in the outer portion 139 of the grand-total display aperture. The series of numbers carried on the ring 138 extends from 00 to 30 (each one one-hundredth of the circumference apart) or to such other number within 100 as will represent the maximum grand total of hundreds attainable in completing any particular game in which the scorer is being used. Ordinarily for card games it will suffice that this ring carry the numbers 00 to 30, so that seven-tenths of the circumference of the ring will not be occupied by such numbers and may be otherwise utilized. Following these numbers therefore the ring is pierced with the series of holes to the same number—30 or otherwise—as the ring carries notation; these holes are symmetrically arranged at one-hundredth of the circumference apart, and are figured 140 in the drawing. Access to them is gained through a sector slot 141 in the lid 105, and one of the holes marked 140$^x$ is so located in relation to the numeration, that when it is brought to the forward end 142 of the slot 141, the numerals 00 will be displayed at the aperture 139. The cover plate is figured 0 to 9 or as the case may be, as shown at 144, in order that a player may locate the particular hole corresponding to a score intended to be recorded by him on the ring dial 138. This ring dial is moved forward as far as may be necessary to indicate scores of 100, 200, and so on by inserting the stylus in the appropriate hole indicated by the numeration 144 and rotating the ring until the stylus is checked by the forward end 142 of the slot 141, in which position the particular number of hundreds so selected by the stylus will be displayed in figures in the aperture 139. The provision of a major grand total ring capable of separate or automatic operation is a distinctive feature of my scoring apparatus. It is of material advantage in that in many modern games in which high scores in hundreds are attainable, such scores may be recorded in a single movement of the major ring instead of in a plurality of movements of a minor-grand-total ring. It is desirable that the ring 138 should be moved ahead automatically one hole for every complete rotation of the ring 127 so that whenever the unit and tens recorded score attains 100, 200, 300 &c. the additional hundred will be struck up on the major grand total in the aperture 139 while the minor grand total will indicate the score in tens and units in excess of such major indicator. This automatic movement is effected by the trick lever and check pawl mechanism now to be described.

The flange 145 of the ring 138 is a loose rotatable fit within the case wall 102. Its bottom edge runs on the bottom plate 101. The lower part of this flange 145 is toothed as shown at 146, the toothing extending sufficiently around it to enable it to be moved automatically through an angle sufficient to bring its extreme numeration below the grand total aperture 139. Where this numeration extends to "30" for instance, it is only necessary that the toothing 146 should occupy about four-tenths of the periphery of the ring, the overlap of one-tenth (in excess of the necessary three tenths) being required to enable the check pawl to engage one of the notches 146 while the drag pawl engages any other of them. Upon the intermediate flange of the ring 127 a striker 150 is fixed. This striker once in each complete rotation of the ring 127 engages an operative part of the progression mechanism shown in Figs. 2 and 7. This progression mechanism comprises a rock lever 151 mounted pivotally on an arbor 152 and carrying a tappet 153 which normally stands in the path of the offset striker 150. A light spring 154 acts on the tail 155 of the lever 151, and operates to press said tail outward toward the case. This spring 154 is mounted in a post 156 fixed in the bottom plate 101. The knuckle 157 at the operative end of the lever normally engages a stop check 158 fixed on the bottom plate 101 and limits forward movement of the operative end of the lever 151. Upon contact of the striker 150 with the tappet 153, the lever 151 is moved outward toward the case wall but is immediately thereafter returned to the position shown in Fig. 2 by means of the spring 154. A drag pawl 159 is carried pivotally at 160 on the operative end of the lever 151 and the tail of this pawl is acted upon by a flat spring 161 the root of which is fixed in a post 162 in the body of the lever 151. The catch tooth 163 of the pawl 159 is normally kept outward by the action of the spring 161 and so engages the toothing 146 in the flange 145 of the ring 138. The rocking movement of the lever 151 during the contact of the striker 150 with the tappet 153 operates to move the tooth 163 of the drag pawl 159 through a circular path equal to the spacing of the rack teeth 146; consequently each such rock movement of the lever 151 will have the effect of dragging round the ring 138 through a distance equal to one notch, that is to say through an advance of one point in the numeration from 00 to 01, and so on. A spring lock pawl 165 placed rearward of the drag pawl 159 ingages the notches 146 in turn and operates to hold the ring 138 against accidental reversal. A lock pawl 166 pivotally mounted at 167 in the case is placed ahead of the drag link 159 and similarly engages the notches 146 when the lever 151 has attained the limit of outward movement or nearly so. This pawl operates to lock the ring 146 against overrunning, so that each movement of the drag link 159 can effect its advance through one tooth space only. The heel piece 170 on the lever 151 acts against the back of the pawl 166 to press its tooth point into one of the ring teeth 146 when the lever 151 has been advanced a certain distance outward corresponding to a forward movement of the pawl tooth 163, equal to one tooth spacing in the ring 138. The ring 138 is thus positively held after being advanced that distance, but the heel piece 170 is moved away from the pawl immediately the lever is retired so that said pawl may be moved inwardly out of engagement with the teeth 146 by the ring 138 when it is again moved.

Figure 2:
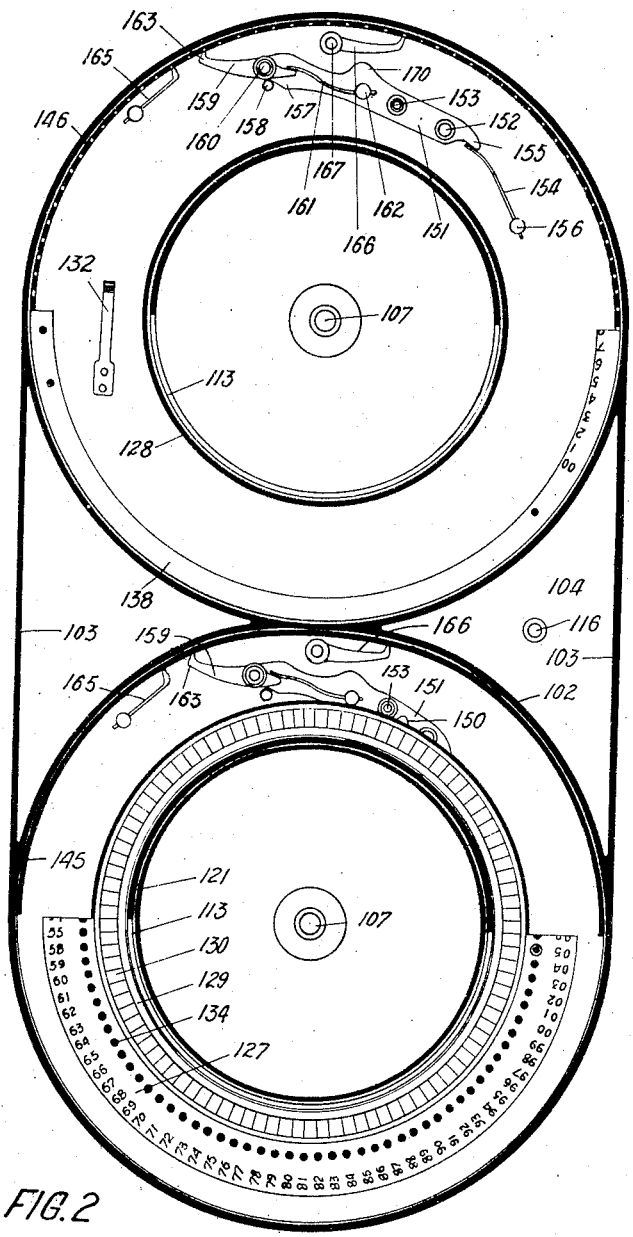
Figure 3:
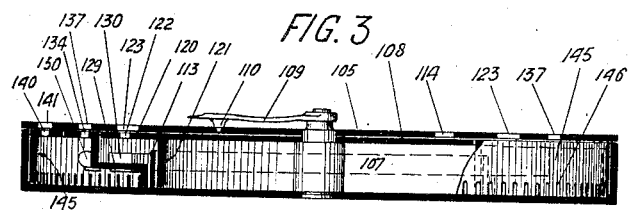
Fig. 3 is a vertical sectional elevation on the line A—A Fig. 1.
Figure 4:
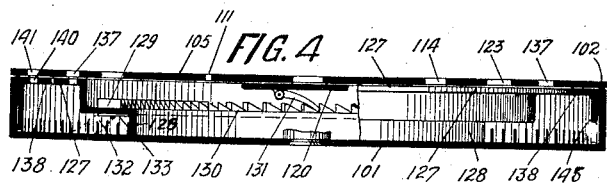
Fig. 4 is an incomplete vertical sectional elevation on line B—B Fig. 1, displaying the pawl by which motion from the trick-points dial is communicated to the minor-grand-total dial, and showing also a brake acting on the latter dial and operating to prevent overrunning and back kicking, and to insure angular register of the two dials.

As shown in Fig. 2, the lever 151 is in the normal inoperative position ready to effect the forward movement of the ring 138 when the striker 150 engages the tappet 153. The drag tooth 163 of the pawl 159 is so shaped in relation to the teeth 146, that the ring 138 may be moved by means of the stylus as many notches as may be necessary to record hundreds of "Honor" "Allowance" or "Penalty" points to be scored. This stylus movement of the outer ring is not communicated to any other part of the mechanism. Reversal of the ring is prevented by the catch pawl 165. The movement of the ring 138 for resetting purposes is always clockwise. This movement is effected by means of the stylus and is continued until the zero hole 140$^x$ comes to the right hand end 142 of the slot 141 in radial alinement with the numeral 0 in the range of figures 144. Similarly the ring 127 is advanced clockwise for resetting purposes, this movement being continued until the zero hole 134$^x$ comes to the right hand end 135 of the slot 137 and in radial alinement with the numeral 0 on the range of figures 172. The trick points ring 120 must however be reset in an anti-clockwise movement, for otherwise the pawl 131 would engage the crown 130 and advance the ring 127. It would be practicable however to effect the resetting of the ring 120 in a clockwise movement (except between games of a rubber), as in the case of the rings 127 and 138, but in that case it would be always necessary to reset this ring before the minor grand total ring 127 is reset. Obviously the relative order of the rings may be altered without affecting the invention. For instance, the trick ring may be the outermost ring and the major and minor grand totals rings located concentrically within it.

The system of construction used which is characterized by the employment of flanged annuli or rings instead of pivot borne superposed disks materially simplifies the manufacture and assembling of the parts and it insures minimum drag of the dials inasmuch as they touch each other only at their peripheries. The provision of the collar 113 insures independence of the middle and inner rings, and enables the fitting of those rings with peripheral clearance, thus insuring their individual freedom of movement.

Obviously the holes 115, 122, 134, 140, 122$^x$ and 122$^z$ need not extend through the rings in which they are respectively formed; it suffices if they are deep enough to accommodate the point of the stylus.

The *modus operandi* in the using of the counter, for instance in the game of "Bridge", is as follows:—

Assuming that the contract is two tricks in "Hearts", the declaration pointer 109 is set to the position shown in the dotted lines in Fig. 1, thereby indicating "Hearts" and the numeral 2. It will be further assumed that the game beginning is the first game to be played. The games counter disk 108 is turned by inserting the stylus in one of the holes 115 and moving it laterally to rotate the disk until the indicator "Nil" is displayed, as in Fig. 1. Further assuming that the declaration has not been "doubled" or "redoubled", the straddling disk 119 is similarly set to expose the indicator "Nil", also as shown in Fig. 1. As the game proceeds, the trick points are recorded by inserting the end of the stylus in one of the holes 122 indicated by the appropriate numeral in the range of numerals 172, and the disk 120 is then moved clockwise until the stylus is checked against the end 125 of the slot 123. This has the result of exhibiting through the aperture 126 the number of points so struck up. It has the further effect of transmitting a like circular movement to the ring 127 by means of the pawl 131, so that the same number is displayed also in the units and tens portion 136 of the grand total aperture. Assuming now that honor or penalty points are to be recorded, the stylus is inserted in one of the holes 134 in the ring 127, and moved to rotate said ring clockwise until the movement is checked by contact of the stylus with the end 135 of the slot 137. This has the result of further advancing the grand total by the number of points so added, but it has not the effect of disturbing the trick points recorded under the aperture 126. When the ring 127 has made a complete rotation so that the figures exposed in the aperture 136 arrive again at 00, a one tooth movement is applied to the outer ring 138 by means of the trick lever mechanism shown in Fig. 2, and the numeral "1" then appears below the aperture 139, thus showing a grand total of "100". The addition of the "Honors" or "Penalty" points in hundreds is effected by positive movement of the ring 138 by means of the stylus, whereby the figures 00 are progressively advanced so as to show correct addition of the points so added.

The game having been concluded, the games record disk 108 is rotated through a sufficient angle to expose the indicator "One Game" in place of the indicator "Nil". It is not in the game of "Bridge" necessary to record on either scorer dial the fact that more than one game has been won, because the usage is to play three games in a set, the second game won by either party constituting the rubber; but where there is any reason for exhibiting a record of more than one game won, the necessary other indicators may be printed on the disk 108 and exposed by rotating the said disk to bring the required indicator beneath the sector slot 114. The net gain of the winning players is obtained by subtracting the lesser from the greater "grand total" score on the respective "We" and "They" counters.

Figure 7:
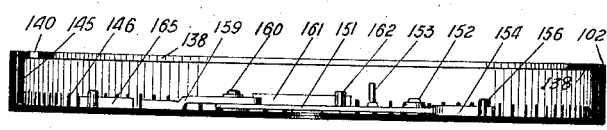
Fig. 7 is a sectional vertical elevation through the case of the system shown in Fig. 6, with all parts removed except the parts fixed in the base thereof and the major-grand-total dial.
Figure 5:
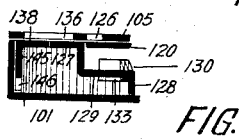
Fig. 5 is a fragmentary vertical section on the radial line of the total indicator apertures in the lid.
Figure 8:
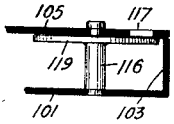
Fig. 8 is a detail sectional elevation through the straddling dial shown in angular central portion of Fig. 1.
Figure 6:
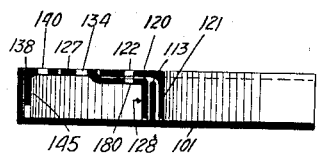
Fig. 6 is a fragmentary section showing relative positions of the three ring dials in the casing in an alternative arrangement wherein the minor-grand-total dial is interlocked with the trick-points dial by the point of a stylus according to an existing system of construction; in this case the pawl driver between these dials is omitted.

In the alternative construction indicated in Figs. 6 and 7 the annular crown 130 and the pawl 131 are not used, and the section of the ring 127 is modified. In this case the holes 122 extend through the ring 120 and a corresponding ring of holes 180 is made in the table of the ring 127, in alinement with the ring of holes 122. The insertion of the stylus through any one of the holes 122 and its engagement in one of the holes 180 then provides a means whereby both rings 120 and 127 may be rotated together.

What I claim as my invention and desire to secure by Letters Patent is:—

1. A mechanical game scorer, comprising a rotatable indicating element, a second indicating element concentric therewith and independently rotatable, means connecting said elements so that the second element is rotated whenever the first element is rotated and through the same angular distance, a third indicating element concentric with the others, and rotatable independently thereof, and means operated at the completion of a predetermined amount of rotation of the second element for advancing the third element one step.

2. A mechanical game scorer as claimed in claim 1, wherein the connecting means between the first and second indicating elements comprises a pawl on one element coacting with a series of ratchet teeth on the other element, said pawl and teeth being arranged so that the first element always drives the second but the latter is independently rotatable.

3. A mechanical game scorer as claimed in claim 1, wherein the last mentioned means comprises a projection on the second element, a lever directly movable by said projection at the completion of said predetermined amount of rotation, means operable by said lever to engage and advance the third element, and means operable by said lever at the completion of its movement by said projection for positively limiting the advance of the third element.

4. A mechanical game scorer, comprising a pair of rotatable indicating elements, and means operable by one element at the completion of a predetermined amount of rotation thereof for advancing the second element one step, said means comprising a lever pivoted at one end and extending substantially circumferentially between the peripheral surfaces of said elements, a pawl pivotally mounted at the other end of said lever, teeth on said second element normally engaged by said pawl, and a projection on the periphery of the first element engaging said lever at the completion of said predetermined rotation to move the pawl carrying end thereof both toward and circumferentially of the peripheral surface of the second element to cause the pawl to advance said element one tooth space.

5. A mechanical game scorer, comprising a pair of rotatable indicating elements, and means operable by one element at the completion of a predetermined amount of rotation thereof for advancing the second element one step, said means comprising a projection on the first element, a lever directly movable by said projection at the completion of said predetermined rotation, means operable by said lever to engage and advance the second element, a pawl pivoted adjacent said lever, and teeth on said second element adapted to be engaged by said pawl, the latter being moved by said lever at the completion of its movement by the projection on the first element to engage a tooth on the second element to positively limit the advance of the element.

6. A mechanical card game scorer, comprising a stationary dial plate, an indicator at the central portion of said plate comprising a plurality of sectors each containing a suite symbol and a series of numerals associated with such symbol, a pointer rotatably mounted at the center of said plate and settable to indicate any numeral in any sector, and a plurality of point indicating elements coöperating with apertures in said dial plate to indicate points scored, said plate having sector shaped slots to permit operation of said elements therethrough.

7. A mechanical card game scorer as claimed in claim 6, wherein an arbor is arranged centrally of the dial plate and rotatably carries said pointer, and an indicating disk is rotatable on said arbor beneath said plate, said disk bearing symbols indicating games won and said plate being apertured to render said symbols visible and slotted to permit operation of said disk.

8. A mechanical game scorer, comprising a casing, a pair of concentric rotatable indicating elements mounted within said casing, apertures in said casing coöperating with said elements to indicate scores, slots in said casing adjacent said disks to permit operation of the latter, and means arranged between said elements and operated by one element to cause simultaneous and equal angular movement of the other element, said means being such as to permit independent rotation of the second element.

9. A mechanical game scorer as claimed in claim 8, wherein the means between the said elements comprises a pawl carried by one element normally continuously coacting with a series of ratchet teeth on the other element.

10. A mechanical game scorer as claimed in claim 9, wherein one element is formed with a flange lying beneath and spaced from the second element and having a series of upwardly extending ratchet teeth thereon, the second element carrying a depending gravity pawl located between the element and said flange and engaging the teeth of the latter.

11. A mechanical game scorer, comprising a shallow cylindrical casing, a plurality of concentric, annular, rotatable indicating elements within said casing, and connecting means between successive pairs of elements, said means being operated by one element of a pair to cause rotation of the other element of said pair, each of said elements being of angular cross-section having a horizontal flange lying adjacent the top of the casing and a vertical flange resting at its lower edge on the bottom of the casing, said connecting means extending between the horizontal and vertical flanges of said elements.

12. A mechanical game scorer as claimed in claim 11, comprising inner and outer elements of right angular cross section, the inner element having an outwardly extending horizontal flange and the outer element having an inwardly extending horizontal flange, and an intermediate element of double right angular cross section having a horizontal flange lying between the horizontal flanges of the other elements.

13. A card game scorer comprising a shallow cylindrical case with sector slotted and apertured lid, concentrically disposed flanged rings rotatably housed in said casing and respectively alining with sector slots in said lid and bearing numerals indicating trick scores and grand total scores respectively, a game record disk dial rotatable within said rings on a central arbor which supports said lid, and a sector slotted aperture in said lid in alinement with symbols on said disk, a fixed dial with suit symbols and odd tricks numerators on the center of the lid, a pointer rotatable over said dial, ranges of stylus holes in said rotatable rings and disks and fixed series of numerals on the case lid contiguous to said sector slots therein, and means for interlocking the movement of the trick dial and the grand total dial in the recording of the trick points, substantially as herein described.

In testimony whereof I have affixed my signature in the presence of two witnesses.

RALPH HERBERT PAUL.

Witnesses:
CHAS. BLACKFORD,
S. KAFLISCH.